(12) United States Patent
Tulloch et al.

(10) Patent No.: US 11,505,329 B2
(45) Date of Patent: Nov. 22, 2022

(54) JOINING COMPONENTS

(71) Applicant: Airbus Operations Limited, Bristol (GB)

(72) Inventors: William Tulloch, Bristol (GB); Pat Broomfield, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 16/856,346

(22) Filed: Apr. 23, 2020

(65) Prior Publication Data

US 2020/0339271 A1 Oct. 29, 2020

(30) Foreign Application Priority Data

Apr. 25, 2019 (GB) .................................... 1905750

(51) Int. Cl.
*B64D 29/02* (2006.01)
*F16B 5/02* (2006.01)

(52) U.S. Cl.
CPC ............. *B64D 29/02* (2013.01); *F16B 5/02* (2013.01)

(58) Field of Classification Search
CPC ............ B64D 29/02; F16B 5/02; F16B 5/025
See application file for complete search history.

(56) References Cited

U.S. PATENT DOCUMENTS

| 4,682,906 A * | 7/1987 | Ruckert ............... F16B 43/009 403/409.1 |
| 4,878,795 A * | 11/1989 | Woodrow ................ F16B 5/01 411/501 |
| 10,577,958 B2 * | 3/2020 | Kennedy .................. F01D 5/04 |
| 2010/0133376 A1 | 6/2010 | Foyer et al. |

(Continued)

FOREIGN PATENT DOCUMENTS

| CN | 103785874 | 5/2014 |
| DE | 297 09 250 | 8/1997 |

(Continued)

OTHER PUBLICATIONS

English translation FR-3070427-A1 (Year: 2019).*

(Continued)

*Primary Examiner* — Jason L Vaughan
*Assistant Examiner* — Amanda Kreiling
(74) *Attorney, Agent, or Firm* — Nixon & Vanderhye P.C.

(57) ABSTRACT

A component which is configured to be joined to a further component in a preselected relative orientation is disclosed. The further component has an interface surface and the component is configured to contact the interface surface when joined to the further component. The component includes a surface disposed on a side of the component intended to face the interface surface when the components are joined, a plurality of recesses formed in the surface, and a plurality of spacer elements. Each recess has a preselected orientation relative to the component, the preselected orientation being selected in dependence on the preselected (Continued)

relative orientation. Each spacer element comprises a contact surface configured to contact the interface surface when the components are joined. Each spacer element is disposed in one of the recesses such that the orientation of a given contact surface is defined by the orientation of the corresponding recess.

21 Claims, 3 Drawing Sheets

(56) References Cited

U.S. PATENT DOCUMENTS

| | | |
|---|---|---|
| 2014/0261639 A1 | 9/2014 | Kim |
| 2016/0090858 A1* | 3/2016 | Barthelet ................ F01D 9/048 417/406 |

FOREIGN PATENT DOCUMENTS

| | | | |
|---|---|---|---|
| EP | 0 561 590 | 9/1993 | |
| EP | 3 098 459 | 11/2016 | |
| FR | 2 916 424 | 11/2008 | |
| FR | 3 070 427 | 3/2019 | |
| FR | 3070427 A1 * | 3/2019 | ........... F01D 25/246 |
| GB | 1 478 174 | 6/1977 | |

OTHER PUBLICATIONS

Combined Search and Examination Report for GB Application No. 1905750.4 dated Oct. 25, 2019, 6 pages.
"Replaceable Interface Pad", Research Disclosure <www.researchdisclosure.com>, database No. 658026, two pages, published in paper journal Feb. 2019 and digitally Jan. 8, 2019.
Extended European Search Report for European Patent Application No. 20164911.8, nine pages, dated Sep. 10, 2020.
Communication pursuant to Article 94(3) EPC for European Patent Application No. 20164911.8, five pages, dated Mar. 18, 2022.

* cited by examiner

JOINING COMPONENTS

CROSS RELATED APPLICATION

This application claims priority to United Kingdom Patent Application GB 1905750.4, filed Apr. 25, 2019, the entire contents of which is hereby incorporated by reference.

TECHNICAL FIELD

The present invention relates to components configured to be joined to further components, to assemblies of such components joined to further components, to aircraft comprising such components, and to methods of joining components.

BACKGROUND

Most conventional aircraft have engines mounted to the wings by engine mounting pylons. For commercial airliners there is a trend toward higher bypass ratio engines, which have larger diameters than lower bypass ratio engines. To accommodate large diameter engines whilst maintaining sufficient clearance between the engine and the ground it is desirable to minimize the vertical distance between the top of the engine and the lower surface of the wing.

In order to minimize the vertical distance between the top of the engine and the lower surface of the wing, it is desirable to attach the engine mounting pylon directly to the wing. However; the lower surface of the wing is curved, due to the aerofoil shape whilst the upper surface of an engine mounting pylon is typically substantially flat (planar). The upper surface of the engine mounting pylon will therefore only abut the lower surface of the wing over a relatively small area. In order to allow fastening together of the pylon and the wing, and effective load transmission therebetween, it is therefore desirable to provide some sort of interface component to fill the gaps between the upper surface of the pylon and the lower surface of the wing, at least in the locations where fasteners joining the pylon and wing are present.

SUMMARY

A first aspect of the present invention provides a component which is configured to be joined to a further component in a preselected relative orientation of the component and the further component. The further component has an interface surface and the component is configured to contact the interface surface when joined to the further component. The component comprises: a surface disposed on a side of the component intended to face the interface surface when the component is joined to the further component, a plurality of recesses formed in the surface, and a plurality of spacer elements. Each recess has a preselected orientation relative to the component, the preselected orientation being selected in dependence on the preselected relative orientation of the component and the further component. Each spacer element comprises a contact surface configured to contact the interface surface when the component is joined to the further component. Each spacer element is disposed in one of the recesses such that the orientation of a given contact surface is defined by the orientation of the corresponding recess.

Optionally, the curvature of the surface is different to the curvature of the interface surface. Optionally, the surface is curved and the interface surface is substantially flat.

Optionally, the shape of each spacer element matches the shape of the recess in which it is disposed. Optionally, each recess and each spacer element is cylindrical.

Optionally, all of the recesses have substantially the same diameter.

Optionally, all of the recesses have the same orientation relative to the component.

Optionally, there is an interference fit between each spacer element and the recess in which it is disposed.

Optionally, a fastener hole extends through at least one spacer element in a direction substantially perpendicular to the contact surface.

Optionally, each recess comprises a counterbore.

A second aspect of the invention provides an assembly. The assembly comprises a first structure which defines a datum plane for the assembly, and a second structure fixedly attached to the first structure such that the second structure has a preselected orientation relative to the datum plane. The first structure comprising a first surface and the second structure comprises a second surface. The first surface comprises a plurality of sockets extending into the first surface at a predefined angle to the datum plane. Each socket contains an interface component having a first end in contact with a base of the socket and a second end in contact with the second surface.

Optionally, the second end of each interface component comprises an interface surface which is in contact with the second surface, and the orientation of each interface surface is set by the orientation of the corresponding socket.

Optionally, the first structure is fixedly attached to the second structure by at least one fastener, and the fastener extends through one of the interface components.

Optionally, the fastener comprises a tension bolt.

Optionally, the assembly further comprises a third structure attached to the second structure such that the first structure is between the third structure and the second structure. Optionally, the first structure comprises a plate having a further surface opposite to the first surface, and the further surface is configured to match a surface of the third structure which faces the first structure.

Optionally, the third structure is comprised in a first aircraft structure and the second structure is comprised in a second aircraft structure. Optionally, the first aircraft structure is a wing and the second aircraft structure is an engine mounting pylon.

A third aspect of the invention provides an aircraft comprising the component of the first aspect or the assembly of the second aspect.

A fourth aspect of the invention provides a method of joining a first component to a second component in a predetermined relative position and orientation of the first and second components. The method comprises:

providing a first component having a first surface;
providing a second component having a second surface;
forming a plurality of recesses in the first surface, such that each recess is oriented relative to the first component based on a desired relative orientation of the first and second components when joined;
providing a plurality of spacer elements, each spacer element being configured to be received in one of the recesses and having a contact surface configured to contact the second surface when the second component is joined to the first component;
inserting a spacer element into each recess;
arranging the second component on the spacer elements such that the contact surfaces of the spacer elements are in contact with the second surface and the first component and the second component are in the desired relative position and orientation; and connecting the first component to the second component.

Optionally, the first component and the plurality of spacer elements together comprise a component according to the first aspect.

Optionally, performance of the method results in the formation of an assembly according to the second aspect.

BRIEF DESCRIPTION OF THE DRAWINGS

Embodiments of the invention will now be described, by way of example only, with reference to the accompanying drawings, in which.

DETAILED DESCRIPTION

Figure 1:
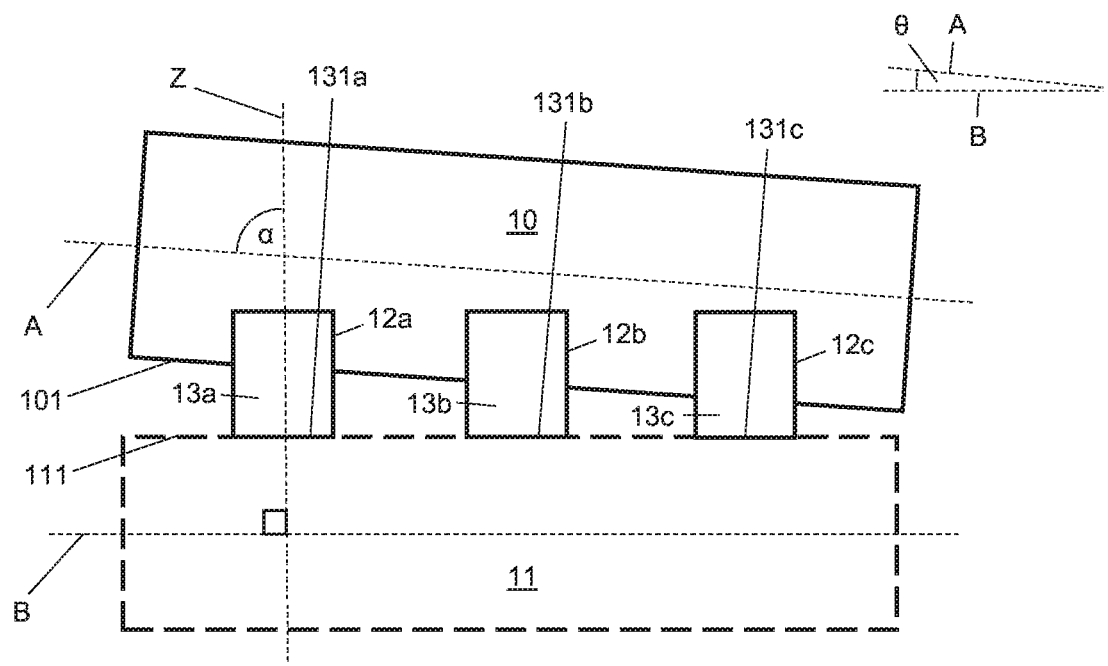
FIG. 1 is a schematic cross-section through an example component according to the invention.

The examples described below relate to components, each of which is configured to be joined to a further component in a preselected relative orientation of the component and the further component. Each further component to which an example component is configured to be joined has an interface surface. Each example component is configured to contact the interface surface when joined to the further component. Each example component comprises a surface disposed on a side of the component intended to face the interface surface when the component is joined to the further component; a plurality of recesses formed in the surface; and a plurality of spacer elements, each of which is disposed in one of the recesses. Each recess has a preselected orientation relative to the component, which is selected in dependence on the preselected relative orientation of the component and the further component. Each spacer element comprises a contact surface configured to contact the interface surface when the component is joined to the further component, and the orientation of a given contact surface is defined by the orientation of the corresponding recess.

The terms "preselected" and "predefined" as used throughout this specification are intended to mean that a parameter value is set based on considerations not necessarily related to specific details of the particular components or structures being joined. For example, preselected or predefined values are not intended to be changeable in view of manufacturing tolerances, instead they should be considered as constraints that must be met, despite the potential existence of such tolerances.

Components according to the invention may, for example, be comprised in joints between aircraft wings and aircraft engine mounting pylons. An engine mounting pylon may generally be attached to a wing box by a forward coupling and an aft coupling. The example components according to the invention may be especially suitable for use in forward couplings between engine mounting pylons and wing boxes. The forward coupling between an engine mounting pylon and a wing box supports the weight of the pylon and transmits thrust from the engine to the wing.

As discussed above, the surfaces of a wing and an engine mounting pylon which lie adjacent each other at the joint between the wing and pylon generally have different curvature—the wing is curved whilst the top of the pylon is typically flat. Nevertheless, the relative orientation of the wing and pylon must be carefully controlled, to within tight tolerances, to ensure that the aircraft performs correctly. It is known to address this issue by providing one or more interface plates between the wing and pylon, which are shaped to exactly match the lower surface of the wing and the upper surface of the pylon. Such interface plate(s) set the relative orientation of the wing and pylon by exactly filling a gap therebetween, with the shape of the gap depending on the desired relative orientation of the wing and pylon.

To ensure that the joint performs well for a reasonable length of time, the surfaces of the interface plate(s) must be carefully controlled to closely match the surfaces that it is intended to contact, as well as being precisely oriented to produce the desired relative orientation of the pylon and the wing. The shaping of the interface plate must therefore be performed to a high degree of precision. For these reasons, creating such interface plates is time-consuming, and can be difficult if the material needs to be highly wear resistant (which it generally does for a wing-pylon joint, or any other joint which must transmit high loads during operation). The final shape of the wing lower surface cannot be determined until the late stages of manufacturing the wing, due to the build-up of manufacturing tolerances. For this reason, known interface plates are typically machined in-situ once the wing build is substantially complete. To create a surface on an interface plate which exactly matches the upper surface of the pylon, a milling machine controllable in 6 degrees of freedom is required. Such machines are large and costly, and their use adds considerably to the cost and difficulty of the aircraft manufacturing process.

Components according to the invention seek to address these issues, and thereby to enable more time and cost-efficient processes for joining two components in a preselected relative orientation of those components. The components according to the invention are especially suitable for use in high-load joints, such as joints between aircraft engine mounting pylons and aircraft wings. The recesses and spacer elements comprised in the components according to the invention enable the relative orientation of two components to be set very precisely, whilst requiring only simple machining operations needing to be performed during the joining process.

Each recess can, for example, have a simple geometrical shape that is easy to create, such as a cylindrical bore. The depth and/or orientation of such a bore can be precisely set, using relatively simple assembly tools, in dependence on the preselected relative orientation of the components and/or on the length of a spacer element which is to be inserted into the bore. When such a cylindrical spacer element is then inserted into the bore, the contact surface of the spacer element is oriented at an angle which depends on the orientation of the bore, and the contact surface of the spacer element protrudes from the surface of the component by a distance which depends on the depth of the bore. The contact surfaces of the spacer elements thereby collectively provide a precisely controlled surface against which a further component can abut.

FIG. 1 is a cross-section through a particular example component 10 according to the invention. The component 10 is configured to be joined to a further component 11 in a preselected relative orientation of the component 10 and the further component 11. The further component 11 is shown in FIG. 1 (using dashed lines to indicate that it does not form part of the claimed invention) in a position such that the component 10 and the further component 11 are in the preselected relative orientation. The further component 11 has an interface surface 111. In this particular example the interface surface 111 is substantially flat, although that need not be the case in other examples. The component 10 and the further component 11 may be any components which it is desired to join in a preselected relative orientation. In some examples the component 10 and the further component 11 are aircraft components. The component 10 may, for example, be a component of an aircraft wing and the further component 11 may be a component of an aircraft engine mounting pylon. The component 10 may be an interfacing component (such as an interface plate) for facilitating the joining of the further component to another component.

The component 10 is configured to contact the interface surface 111 of the further component 11 when the component 10 is joined to the further component 11. In particular, the component comprises a plurality of spacer elements 13a-c, each of which comprises a contact surface 131a-c. Each of the contact surfaces 131a-c contacts the interface surface 111 when the component 10 is joined to the further component 11, as can be seen from FIG. 1. Each contact surface 131a-c is shaped to match the interface surface 111, such that each contact surface 131a-c is in contact with the interface surface 111 across its entire area when the component 10 and the further component 11 are joined. Thus, in the example of FIG. 1 each contact surface 131a-c is substantially flat. Load transfer between the component 10 and the further component 11 takes place over the collective area of the contact surfaces 131a-c, and the area of the contact surfaces 131a-c may therefore be tailored according to the loads associated with a particular application. In the illustrated example, all of the spacer components 13a-c have the same configuration and are substantially identical to each other.

The component 10 has a surface 101 which is disposed on a side of the component 10 intended to face the interface surface 111 when the component 10 is joined to the further component 11. The surface 101 may have a different curvature to the interface surface 111. In some examples the surface 101 may be curved, whilst the interface surface 111 is substantially flat. The surface 101 has a plurality of recesses 12a-c formed in it. Each recess 12a-c has a preselected orientation relative to the component 10, which is selected in dependence on the preselected relative orientation of the component 10 and the further component 11. The recesses 12a-c may be in the form of cylindrical bores.

The component 10 has a nominal plane A and the further component 11 has a nominal plane B. For simplicity of illustration, in the illustrated example the planes A and B may be assumed to extend perpendicularly to the plane of the page, across their entire areas. Therefore, the planes A and B are parallel to each other in the plane normal to the page. Consequently, the orientation of the planes A and B of FIG. 1 will be discussed in only two dimensions (i.e. the dimensions of the printed page). However, it will be appreciated that for at least some real-world applications, the orientations of the component 10 and the further component 11 will need to be defined using 3-dimensions. That is, the planes A and B may not be parallel in either the plane of the page or in the plane normal to the page.

In the illustrated example, in the preselected relative orientation the planes A and B are not parallel. Instead the plane A is at a preselected angle θ to the plane B. Each recess 12a-c has a nominal axis Z. In the illustrated example, each recess 12a-c has a substantially flat base and the axis Z is perpendicular to the base. Each of the recesses 12a-c is oriented such that the axis Z is at an angle α to the plane A, where α=90−θ. The bases of the recesses 12a-c are therefore not parallel with the surface 101. In some examples the plane A may be a datum plane. In such examples, the plane A may correspond to a datum plane of an aircraft in which the component 10 is comprised (or is intended to be comprised).

The depth of each recess 12a-c is selected in dependence on the preselected relative orientation of the component 10 and the further component 11. In the illustrated example, because the surface 101 is not parallel to the interface surface 111, each of the recesses 12a-c has a different depth. In particular, the left-most recess 12a has the smallest depth, the right-most recess 12c has the greatest depth, and the centre recess 12b has an intermediate depth. The exact values of the depths are selected such that the contact surfaces 131a-c are coplanar with each other. Coplanar contact surfaces could alternatively be achieved by providing recesses of equal depth and spacer elements of varying height. For some applications it may be advantageous to use standard spacer elements and to tailor the depth of the recesses, whereas for other applications it may be advantageous to standardise the depth of the recesses and to tailor the height of the spacer elements.

Each spacer element 13a-c is disposed in one of the recesses 12a-c. The shape of each spacer element 13a-c matches the shape of the recess in which it is disposed. The orientation of a given contact surface 131a-c is therefore defined by the orientation of the corresponding recess 12a-c (the corresponding recess being the recess in which the spacer element comprising the given contact surface is received). In examples in which the contact surfaces 131a-c are substantially flat, each of the contact surface 131a-c is parallel to the interface surface 111. The axis Z of each recess 12a-c is therefore at a right angle to the nominal plane B of the further component 11. Each spacer element 13a-c may be retained in its corresponding recess by any suitable mechanism. For example, the spacer elements 13a-c may be an interference fit in the recesses 12a-c. It will be appreciated that after the further component 11 has been joined to the component 10, the spacer elements 13a-c are retained in the recesses 12a-c by the further component 11. The retaining mechanism is therefore only required to maintain the spacer elements 13a-c in the recesses prior to and during the joining process.

Figure 2:
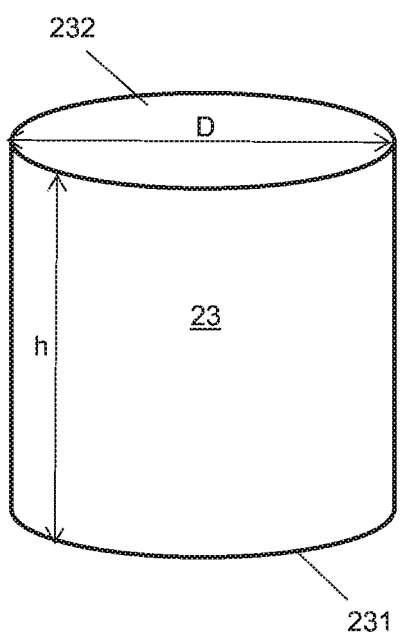
FIG. 2 is a schematic perspective view of an example spacer element of a component according to the invention.

A particular example spacer element 23 is shown in FIG. 2, in isolation from a component in which it is comprised. The spacer element 23 could be any of the spacer elements 13a-c. The spacer element 23 is cylindrical, and is therefore configured to be disposed in a cylindrical recess (e.g. a bore). The spacer element 23 has a diameter D and a height h. The diameter D is substantially equal to the diameter of the recess in which the spacer element 23 is intended to be received. In some examples, the diameter D is selected such that the spacer element 23 is an interference fit in the recess in which it is intended to be received. The height h of the spacer element 23 may have a standard value (that is, all of the spacer elements comprised in a given component 10 have the same height h, and h does not necessarily depend on the particular features of the component 10). However, the invention does not exclude examples in which the height h of each spacer component is tailored to its particular location on the component 10, and/or particular features of the component 10, as mentioned above.

The spacer element 23 may be formed from any suitable material, depending on the particular application. Suitable materials include stainless steel and titanium. For high-load and/or safety critical joints, it may be advantageous to form the spacer element 23 from a wear-resistant material. For aerospace applications it may be advantageous to form the spacer element 23 from a relatively lightweight material. The spacer element 23 may be formed from a different material to the rest of a first component in which it is intended to be comprised. In particular, the spacer element 23 may be stronger and/or more wear-resistant than the main body of a first component in which it is intended to be comprised.

Figure 3:
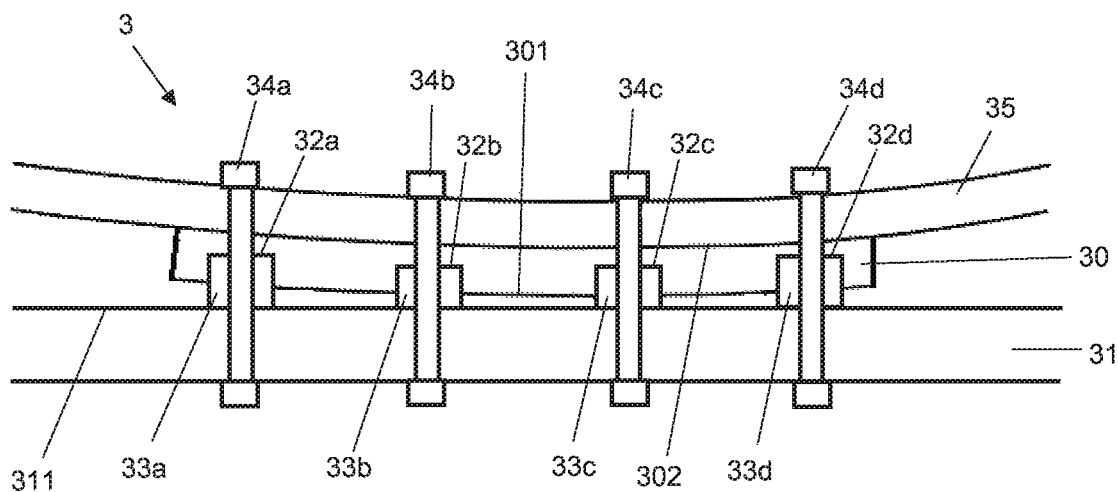
FIG. 3 is a schematic cross-section through an example assembly according to the invention.

FIG. 3 shows an example assembly 3 according to the invention. The assembly 3 comprises a first structure 30 and a second structure 31 which is fixedly attached to the first structure 30. The first structure 30 may be a component according to the invention, such as the component 10 of FIG. 1. The second structure 31 may be a further component according to the invention, such as the further component 11 of FIG. 1. The first structure 30 comprises a first surface 301 and the second structure 31 comprises a second surface 311. The first surface 301 is curved and convex, and the second surface 311 is substantially flat. The first structure 30 defines a datum plane for the assembly, and the second structure 31 has a preselected orientation relative to this datum plane.

The illustrated example assembly 3 further comprises a third structure 35. Other examples are envisaged in which the third structure 35 is not present. The following discussion applies equally to such two-structure assemblies, except where explicitly stated otherwise. The third structure 35 is attached to the second structure 31 such that the first structure 30 is between the third structure 35 and the second structure 31. In the example of FIG. 3, the first structure 30 comprises a plate which has a further surface 302 opposite to the first surface 301. The plate is an interface plate for facilitating joining the second structure 31 to the first structure 30. The further surface 302 is configured to match a surface of the third structure 35 which faces the first structure 30. For example, the further surface 302 may contact the surface of the third structure 35 across substantially the entire area of the further surface 302. It is expected that the first surface 301 will generally not match the second surface 311, because creating these surfaces such that they match would be difficult and time-consuming, and is rendered unnecessary by the provision of the interface components 33*a-d*.

The first surface 301 comprises a plurality of sockets 32*a-d* extending into the first surface 301. Each socket is at a predefined angle to the datum plane. That is, each socket may be considered to have an axis, and this axis is at a predefined angle to the datum plane. The axis of a socket may correspond to the axis of the tool (such as a drill, or boring machine) used to create that socket, during the process of creating the socket. Each socket 32*a-d* has a base, which in the illustrated example is substantially flat. Each socket 32*a-d* may have substantially the same features as the recesses 12*a-c* of FIG. 1.

Each socket 32*a-d* contains an interface component 33*a-d*. Each interface component 33*a-d* has a first end which is in contact with the base of the socket in which that interface component is contained, and a second end which is in contact with the second surface 311. Each interface component 33*a-d* may have substantially the same features as the interface components 13*a-c* of FIG. 1. The interface components 33*a-d* are not all of equal size. Instead, each interface component 33*a-d* has the same diameter, but the outermost interface components 33*a*, 33*d* have a first, relatively greater height and the innermost interface components 33*b*, 33*c* have a second, relatively smaller height. However; the first height and the second height are nevertheless standard values which are not tailored to the particular configuration of the first component 30. Instead, as with the example of FIG. 1, the depths of the recesses 32*a-c* are selected to ensure that the surfaces of the second ends of the interface components 33*a-d* are coplanar, taking into account the differing heights of the interface components 33*a-d*. The surfaces of the second ends of the interface components 33*a-d* contact, (and thereby interface with) the second component 31, and may therefore be considered to be interface surfaces. The orientation of each interface surface is set by the orientation of the corresponding socket, in substantially the same manner as the orientation of the contact surfaces 131*a-c* of FIG. 1 is set by the orientation of the recesses 12*a-c*.

The third structure 35 is fixedly attached to the second structure 31 by a plurality of fasteners 34*a-d*. The fasteners 34*a-d* extend through each of the first, second and third structures 30, 31, 35. In examples in which the third structure 35 is not present, the fasteners 34*a-d* fixedly attach the first structure 30 to the second structure 31. Each fastener 34*a-d* extends through a different one of the interface components 33*a-d*. The fasteners 34*a-d* are configured to resist separation of the first, second and third structures 30, 31, 35. The fasteners 34*a-d* may, for example, comprise tension bolts.

An assembly having the general configuration shown in FIG. 3 may find application anywhere it is desired to join two structures in a precisely controlled relative orientation. Such applications may involve joining a flat surfaced structure to a curved surfaced structure (as shown in FIG. 3), or may involve joining two flat surfaced structures (as shown in FIG. 1). Such assemblies may be particular advantageous where it is difficult or impossible to precisely control the exact configuration of the surface on the first structure (i.e. the surface in which the sockets or recesses are formed). In some examples the third structure may be comprised in an aircraft wing, and the second structure may be comprised in an aircraft engine mounting pylon.

Figure 4A:
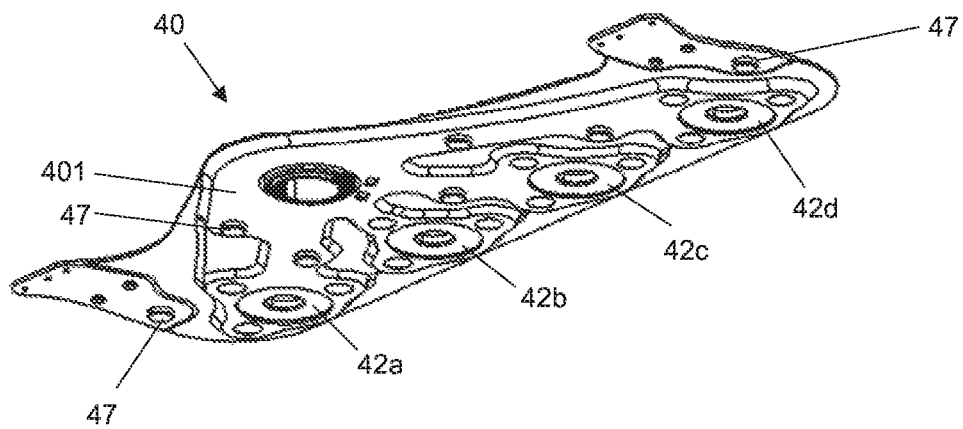
FIG. 4a is a perspective view of an example component according to the invention, at a first stage during assembly of the component.
Figure 4B:
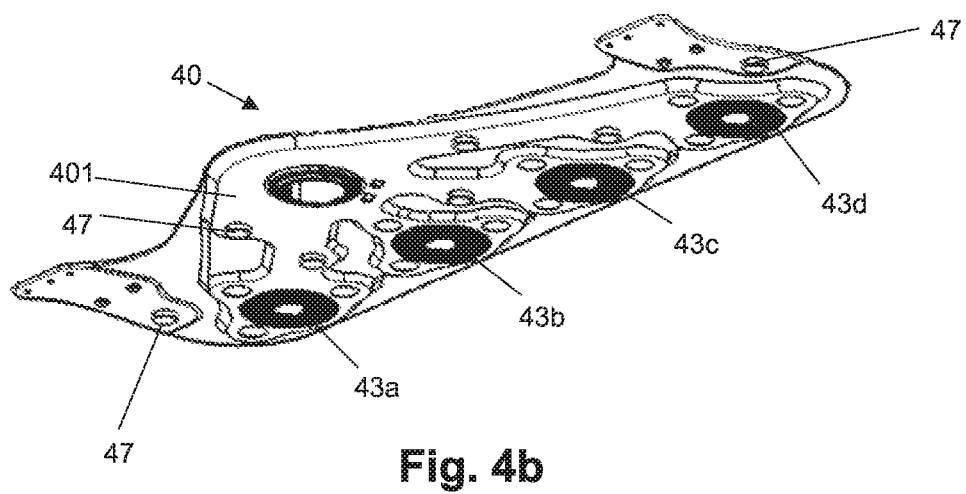
FIG. 4b is a perspective view of the example component of FIG. 4a, at a second stage during assembly of the component.

A process of forming a component according to the invention will now be described with reference to FIGS. 4*a* and 4*b*. FIGS. 4*a* and 4*b* show an example component 40 according to the invention, at two different stages during a process of forming the component 40. The component 40 is an interface plate, configured to be disposed between two aircraft structures (not shown) as part of a joint connecting the aircraft structures. In particular, the interface plate 40 is configured to be disposed between an aircraft wing and an aircraft engine mounting pylon when the pylon is connected to the wing. An upper surface (not visible) of the interface plate 40 is shaped to match a lower surface of the aircraft wing. The interface plate 40 is configured to be attached to the lower surface of the wing by a plurality of fasteners 47.

A lower surface 401 of the interface plate 40 is configured to face an upper (interface) surface of the engine mounting pylon when the engine mounting pylon is connected to the wing. The lower surface 401 of the interface plate 40 is not configured to exactly match the upper (interface) surface of the pylon. The elements of the interface plate 40 may have the same features as corresponding elements of the example component 10 or the example first structure 30 described above, except where explicitly stated otherwise.

The lower surface 401 of the interface plate 40 comprises four recesses 42*a-d*. The interface plate FIG. 4*a* shows the interface plate 40 after the recesses 42*a-d* have been formed, but before spacer elements 43*a-d* have been inserted into the recesses 42*a-d*. Each of the recesses 42*a-d* is located coaxially with a fastener hole extending through the interface plate 40. These fastener holes are configured to receive tension bolts for fastening the engine mounting pylon to the wing. Each recess 42*a-d* is formed as a counterbore around one of the tension bolt fastener holes. Each recess therefore is substantially cylindrical, with a substantially flat base. Such counterbores may be created relatively easily, using a drill head controllable in only 3 degrees of freedom. By contrast, the formation of a state of the art custom interface plate requires a cutter or milling machine controllable in 6 degrees of freedom.

The diameter of each recess 42*a-d* matches the diameter of the spacer elements 43*a-d*, so that one of the spacer elements 43*a-d* can be inserted (with an interference fit) into each of the recesses 42*a-d*. The depth and orientation of each recess 42*a-d* is set by the drilling process, in dependence on a desired relative orientation of the wing and engine mounting pylon. For example, a CNC drilling tool may be programmed to create each recess based on measurements of the lower surface 401 of the interface plate 40 and/or the lower surface of the wing, the upper surface of the pylon, and a preselected relative orientation of the wing and pylon. It is possible to control the depth and orientation of the recesses 42*a-d* very precisely using such a drilling process.

FIG. 4*b* shows the interface plate 40 at a later stage of the process of forming the interface plate 40. A spacer element 43*a-d* (shown in black in FIG. 4*b*) has been inserted into each recess 42*a-d*. The spacer elements 43*a-d* are cylindrical, and have substantially the same features as the example spacer element 23 described above. The spacer elements 43*a-d* are retained in the recesses 42*a-d* by means of an interference fit between each spacer element 43*a-d* and the recess in which it is disposed. The spacer elements 43*a-d* are all substantially identical to each other. The spacer elements 43*a-d* are formed from a material that has greater wear resistance than the material from which the main body of the interface plate 40 is formed. For example, the spacer elements 43*a-d* may be formed from stainless steel and the main body of the interface plate 40 may be formed from aluminium.

Each of the spacer elements 43*a-d* comprises a pre-drilled fastener hole, which is coaxial with the spacer element. The diameter of the fastener holes may be larger than the diameter of studs intended to be inserted through the fastener holes, to permit some tolerance in the angle of the studs. Alternatively, the diameter of the fastener hole may be substantially equal to the diameter of the studs.

Figure 5:
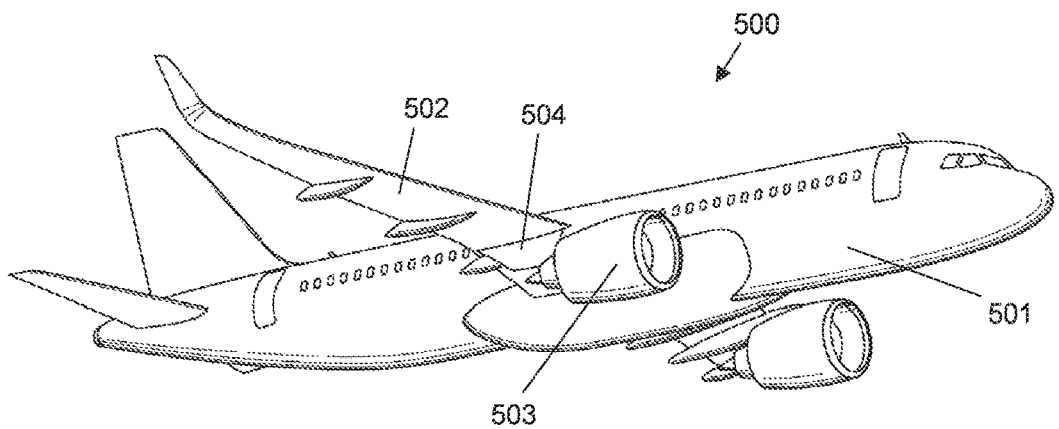
FIG. 5 is a perspective view of an example aircraft comprising a component according to the invention.

FIG. 5 shows an example aircraft 500 which comprises one or more components or assemblies according to the invention. In particular, the aircraft 500 comprises a fuselage 501, and a wing 502, to which an engine mounting pylon 504 is attached. An engine 503, which may for example be an Ultra-High-Bypass Ratio (UHBR) engine, is mounted on the engine mounting pylon 504. The engine mounting pylon 504 is close-coupled to the wing 502. A joint between the engine mounting pylon 504 and the wing 502 comprises an example component according to the invention (e.g. any of the example components or assemblies 10, 3, 30, 40 described above). The aircraft 500 also includes a further wing, engine mounting pylon and engine. The further wing and engine mounting pylon may be connected in the same manner as the wing 502 and pylon 504.

The aircraft 500 may also include one or more further components or assemblies according to the invention, which may connect together aircraft structures other than pylons and wings.

Figure 6:
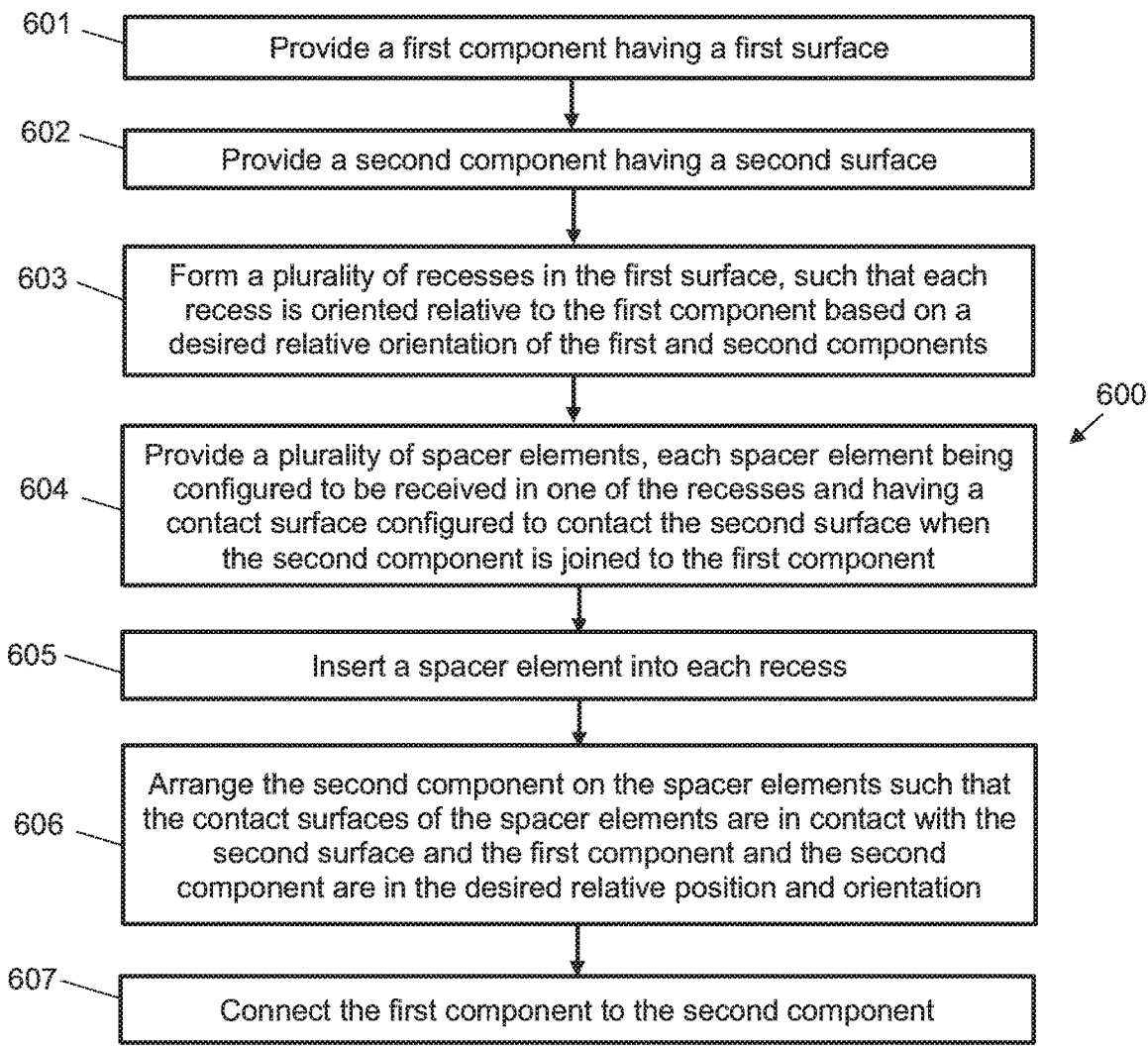
FIG. 6 is a flow chart of an example method according to the invention.

FIG. 6 is a flow chart illustrating a method 600 of joining a first component to a second component in a predetermined relative position and orientation of the first and second components. The first component may be a first component or a third component according to any of the above described examples. The second component may be a second component according to any of the above described examples. Performing the method may result in the formation of an assembly according to the invention, such as the example assembly 3 described above.

In a first block 601, a first component having a first surface is provided. The first component may be, for example, any of the example first components or structures 11, 31, 41. In some examples the first component may be provided pre-attached to a further component, such as the example third structure 35.

In block 602, a second component having a second surface is provided. The second component may be, for example, any of the example second components or structures 11, 31.

In a third block 603, a plurality of recesses is formed in the first surface, such that each recess is oriented relative to the first component based on a desired relative orientation of the first and second components when joined. The desired relative orientation may comprise an angle between a first plane associated with the first component and a second plane associated with the second component. The desired relative orientation is a preselected relative orientation of the first and second components. In some examples the plane associated with the first component may correspond to a datum plane of an aircraft in which the first component is comprised.

Forming the plurality of recesses may comprise selecting an orientation of each recess. Forming the plurality of recesses may comprise selecting a depth of each recess. Selecting an orientation and/or depth of each recess may be performed based on configuration data for the first surface and the second surface. Such configuration data may be obtained, for example, by scanning or otherwise measuring the first and second surfaces. Preferably such measuring is done with a high level of accuracy. The configuration of a gap between the first surface and the second surface when the first component and the second component are arranged in the desired relative orientation may be determined, based on configuration data for the first and second surfaces.

Selecting an orientation and/or depth of each recess may be performed based on configuration data for the first surface and the second surface in combination with data relating to the desired relative orientation of the first and second components. Selecting a depth of each recess may be performed additionally based on configuration data for spacer elements intended to be inserted into the recesses. For example, the depth of a given recess may be selected based on the width of a gap between the first and second surfaces at the location of the given recess when the first and second components are in the desired relative orientation, in combination with the height of a spacer element intended to be inserted into the given recess. The recesses are formed to have shapes corresponding to the shapes of spacer elements intended to be inserted into the recesses. In some examples the recesses are formed such that such spacer elements will be an interference fit in the recesses.

Forming the plurality of recesses may comprise programming an automated tool, such as a CNC drilling machine, to create recesses having the selected orientations and depths. Forming the plurality of recesses may comprise creating counterbores having the selected orientations and depths. One or more of the recesses may be formed coaxially with a fastener hole already present in the first component. Forming the plurality of recesses may comprise controlling a cutting or drilling tool in a maximum of 3 degrees of freedom.

In a fourth block 604, a plurality of spacer elements are provided. Each spacer element may have the same design as any of the example spacer elements or spacer components 13*a-c*, 23, 33*a-d*, 43*a-d*. Each spacer element is configured to be received in one of the recesses formed in block 603. In some examples each spacer element in the plurality is substantially identical to each other. For example, the spacer elements may be supplied as standard parts. In such examples, the formation of the recesses is controlled accordingly. However, other examples are possible in providing a plurality of spacer elements comprises creating or modifying one or more of the spacer elements to match the configuration of a corresponding recess. Each spacer element has a contact surface configured to contact the second surface when the second component is joined to the first component. Preferably each contact surface is configured to contact the second surface across the entire area of that contact surface. In examples in which the second surface is substantially flat, each spacer element is provided with a substantially flat contact surface, which may generally be perpendicular to the axis of that spacer element. However, other examples are possible in which the second surface is not substantially flat. In such examples providing the plurality of spacer elements may comprise creating or modifying a contact surface on one or more of the spacer elements, such that the contact surface contacts the second surface across the entire area of that contact surface.

In a fifth block 605, a spacer element is inserted into each recess. Inserting the spacer elements may comprise pushing the spacer elements into the recesses with enough force to overcome friction between the side walls of the spacer elements and the side walls of the recesses. In some examples, a bonding agent may be applied to one or both of the spacer elements and the recesses before the spacer elements are inserted into the recesses. Block 605 may be performed manually, or automatically (e.g. by an industrial robot).

In block 606, the second component is arranged on the spacer elements such that the contact surfaces of the spacer elements are in contact with the second surface and the first component and the second component are in the desired relative position and orientation. Arranging the second component on the spacer elements may comprise supporting and moving the second component into a position in which the second surface is in contact with each of the contact surfaces of the spacer elements. Additionally, arranging the second component on the spacer elements may comprise aligning fastener holes (or locations where it is intended to create fastener holes) of the second component with fastener holes (or locations where it is intended to create fastener holes) of the spacer components.

As a consequence of the configuration of the recesses and spacer elements, when the second component is in contact with each of the contact surfaces of the spacer elements, the second component and the first component will necessarily be in the desired orientation. This is because the orientation of the contact surfaces relative to the nominal plane of the first component has been set during the process of creating the recesses, as described above. Therefore, only the translational position of the second component relative to the first component needs to be accurately controlled during the arranging of the second component on the spacer elements. Performing block 606 can be achieved in any suitable manner, e.g. using a jig, an industrial robot, or manually. The first component may be maintained in a fixed position and orientation during the performance of block 908, e.g. using a jig or any other suitable assembly equipment.

In block 607, the first component is connected to the second component. Any suitable known technique may be used to perform the connection. For example, connecting the first component to the second component may comprise fastening the first component to the second component. Such fastening may comprise installing one or more fasteners into bores extending through the first component and the second component. In some examples, one or more such fastener may additionally extend through a spacer element. In some examples a fastener may extend through each spacer element. In examples where the first component is attached to a further component, such as the example third structure 35, the fastener may additionally extend through the further component. At least some sections of the fastener bores may be pre-drilled before the components of the assembly have been brought together in a desired final configuration in block 607. Some sections of the fastener bores may be drilled as part of performing block 607, after the components of the assembly have been brought together in the desired final configuration.

Although the invention has been described above with reference to one or more preferred examples or embodiments, it will be appreciated that various changes or modifications may be made without departing from the scope of the invention as defined in the appended claims. For example, although the invention has been described primarily with reference to aircraft applications, it may equally be applied to any other vehicle or structure in which it is desired to join two (or more) components in a preselected relative orientation.

Where the term "or" has been used in the preceding description, this term should be understood to mean "and/or", except where explicitly stated otherwise.

The invention claimed is:

1. A component which is configured to be joined to a further component in a preselected relative orientation of the component and the further component, wherein the further component has an interface surface and the component is configured to contact the interface surface when joined to the further component; the component comprising:
   a surface disposed on a side of the component intended to face the interface surface when the component is joined to the further component;
   a plurality of recesses formed in the surface, wherein each recess has the form of a bore with a preselected depth and an inner surface, and a preselected orientation relative to the component, the preselected orientation and the preselected depth being selected in dependence on the preselected relative orientation of the component and the further component; and
   a plurality of spacer elements, each comprising an outer surface configured to contact the inner surface of the recess, and a contact surface configured to contact the interface surface when the component is joined to the further component, and each spacer element being disposed in one of the recesses such that the orientation of a given contact surface is defined by the orientation of the corresponding recess.

2. A component according to claim 1, wherein the curvature of the surface is different to the curvature of the interface surface.

3. A component according to claim 2, wherein the surface is curved and the interface surface is substantially flat.

4. A component according to claim 1, wherein the shape of each spacer element matches the shape of the recess in which it is disposed.

5. A component according to claim 4, wherein each recess and each spacer element is cylindrical.

6. A component according to claim 5, wherein all of the recesses have substantially the same diameter.

7. A component according to claim 1, wherein all of the recesses have the same orientation relative to the component.

8. A component according to claim 1, wherein there is an interference fit between each spacer element and the recess in which it is disposed.

9. A component according to claim 1, wherein a fastener hole extends through at least one spacer element in a direction substantially perpendicular to the contact surface.

10. A component according to claim 1, wherein each recess comprises a counterbore.

11. An assembly comprising:
a first structure which defines a datum plane for the assembly, the first structure comprising a first surface; and
a second structure fixedly attached to the first structure such that the second structure has a preselected orientation relative to the datum plane, the second structure comprising a second surface;
wherein the first surface comprises a plurality of sockets extending into the first surface at a predefined angle to the datum plane, each socket having an inner surface and forming a bore with a preselected depth, each socket containing an interface component having an outer surface configured to contact the inner surface of the socket, and having a first end in contact with a base of the socket and a second end in contact with the second surface.

12. An assembly according to claim 11, wherein the second end of each interface component comprises an interface surface which is in contact with the second surface, and wherein the orientation of each interface surface is set by the orientation of the corresponding socket.

13. An assembly according to claim 12, wherein the first structure is fixedly attached to the second structure by at least one fastener, and wherein the fastener extends through one of the interface components.

14. An assembly according to claim 13, wherein the fastener comprises a tension bolt.

15. An assembly according to claim 11, further comprising a third structure attached to the second structure such that the first structure is between the third structure and the second structure, wherein the first structure comprises a plate having a further surface opposite to the first surface, the further surface being configured to match a surface of the third structure which faces the first structure.

16. An assembly according to claim 15, wherein the third structure is comprised in a first aircraft structure and the second structure is comprised in a second aircraft structure.

17. An assembly according to claim 16, wherein the first aircraft structure is a wing and the second aircraft structure is an engine mounting pylon.

18. An aircraft comprising the component of claim 1 or an assembly including a first structure which defines a datum plane for the assembly, the first structure comprising a first surface; and
a second structure fixedly attached to the first structure such that the second structure has a preselected orientation relative to the datum plane, the second structure comprising a second surface;
wherein the first surface comprises a plurality of sockets extending into the first surface at a predefined angle to the datum plane, each socket containing an interface component having a first end in contact with a base of the socket and a second end in contact with the second surface.

19. A method of joining a first component to a second component in a predetermined relative position and orientation of the first and second components, the method comprising:
providing a first component having a first surface;
providing a second component having a second surface;
forming a plurality of recesses in the first surface, such that each recess has the form of a bore and an inner surface, and each recess is oriented relative to the first component based on a desired relative orientation of the first and second components when joined;
providing a plurality of spacer elements, each spacer element having an outer surface configured to contact the inner surface of the recess, and being configured to be received in one of the recesses and having a contact surface configured to contact the second surface when the second component is joined to the first component;
inserting a spacer element into each recess;
arranging the second component on the spacer elements such that the contact surfaces of the spacer elements are in contact with the second surface and the first component and the second component are in the desired relative position and orientation; and
connecting the first component to the second component.

20. A method according to claim 19, wherein the first component and the plurality of spacer elements together comprise a component which is configured to be joined to a further component in a preselected relative orientation of the component and the further component, wherein the further component has an interface surface and the component is configured to contact the interface surface when joined to the further component; the component comprising:
a surface disposed on a side of the component intended to face the interface surface when the component is joined to the further component;
a plurality of recesses formed in the surface, wherein each recess has a preselected orientation relative to the component, the preselected orientation being selected in dependence on the preselected relative orientation of the component and the further component; and
a plurality of spacer elements, each comprising a contact surface configured to contact the interface surface when the component is joined to the further component, and each spacer element being disposed in one of the recesses such that the orientation of a given contact surface is defined by the orientation of the corresponding recess.

21. A method according to claim 19, wherein performance of the method results in the formation of an assembly having a first structure which defines a datum plane for the assembly, the first structure comprising a first surface; and
a second structure fixedly attached to the first structure such that the second structure has a preselected orientation relative to the datum plane, the second structure comprising a second surface;

wherein the first surface comprises a plurality of sockets extending into the first surface at a predefined angle to the datum plane, each socket containing an interface component having a first end in contact with a base of the socket and a second end in contact with the second surface.

* * * * *